(12) United States Patent
Lanning et al.

(10) Patent No.: US 12,444,287 B1
(45) Date of Patent: Oct. 14, 2025

(54) ALARM ACTIVATED SAFETY DEVICE

(71) Applicant: New River Electrical Innovations, LLC, Cloverdale, VA (US)

(72) Inventors: Johnny Lanning, Troutville, VA (US); Mark Garofano, Camillus, NY (US); Timothy Batty, Binghamton, NY (US); Barry Williams, Buchanan, VA (US)

(73) Assignee: New River Electrical Innovations, LLC, Cloverdale, VA (US)

( * ) Notice: Subject to any disclaimer, the term of this patent is extended or adjusted under 35 U.S.C. 154(b) by 649 days.

(21) Appl. No.: 17/930,179

(22) Filed: Sep. 7, 2022

Related U.S. Application Data

(60) Provisional application No. 63/241,228, filed on Sep. 7, 2021.

(51) Int. Cl.
  *G08B 23/00* (2006.01)
  *A62B 35/00* (2006.01)
  *G08B 21/02* (2006.01)

(52) U.S. Cl.
  CPC .......... *G08B 21/02* (2013.01); *A62B 35/0068* (2013.01)

(58) Field of Classification Search
  CPC . G08B 21/02; A62B 35/0068; A62B 35/0037; A62B 35/0075; A62B 35/0093; A62B 35/04; F16B 45/023; F16B 45/024; F16B 45/028; G01V 3/101
  USPC .......... 340/500, 539.11, 539.12, 568.1, 571, 340/573.1, 691.1
  See application file for complete search history.

(56) References Cited

U.S. PATENT DOCUMENTS

| | | | |
|---|---|---|---|
| 7,836,529 B2 * | 11/2010 | Cherubini | A47C 31/00 5/652 |
| 2020/0222732 A1 * | 7/2020 | Rutkowski | A62B 35/0037 |
| 2020/0260824 A1 * | 8/2020 | Moran | A44B 11/2519 |
| 2021/0031062 A1 * | 2/2021 | Huseth | F16B 45/028 |
| 2022/0254240 A1 * | 8/2022 | Meyers | G08B 21/043 |

* cited by examiner

*Primary Examiner* — Anh V La
(74) *Attorney, Agent, or Firm* — Bond, Schoeneck & King, PLLC; Frederick J. M. Price

(57) ABSTRACT

An alarm activated safety device includes an enclosure. A longitudinal member having an anchorage point for coupling the alarm activated safety device to a work structure and a safety device connection point located thereon extends through the enclosure and is moveable between a first position with the safety device connection point located within the enclosure to a second position with the safety device connection point located at least partially outside of the enclosure to allow for connection of a safety device thereto. An alarm device is coupled to an alarm control circuit. A switch is configured to operate the alarm control circuit. The switch is engaged by the longitudinal member to move the switch from an activated position for the alarm control circuit when the longitudinal member is in the first position to a deactivated position for the alarm control circuit when the longitudinal member is in the second position.

20 Claims, 17 Drawing Sheets

ALARM ACTIVATED SAFETY DEVICE

REFERENCE TO RELATED APPLICATIONS

This application claims priority to U.S. Provisional Patent Application Ser. No. 63/241,228, filed on Sep. 7, 2021 and entitled "ALARM ACTIVATED SAFETY DEVICE" the entirety of which is incorporated herein by reference.

FIELD

The present disclosure relates generally to a safety device, more particularly, to an alarm activated safety devices.

BACKGROUND

The Code of Federal Regulations, 29 CFR 1926.501 requires that employees working at heights be protected from falls which could result in worker injury. For example, workers are required to wear a personal fall arrest system with connected lanyard when working in an aerial situation, such as in a bucket truck, scaffolding, man lift, or crane with personnel man basket. However, often times workers fail to remember to attach the absorbing lanyard from the body harness to the proper anchor point. Most conventional safety devices designed to remind workers to make or monitor the connection are built into the lift and/or are expensive.

The present disclosure is directed to overcoming these and other deficiencies in the art.

Description of the Related Art Section Disclaimer: To the extent that specific patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY

One aspect of the present disclosure relates to an alarm activated safety device. The alarm activated safety device includes an enclosure having an opening extending therethrough. A longitudinal member having an anchorage point for coupling the alarm activated safety device to a work structure and a safety device connection point located thereon extends through the opening of the enclosure and is moveable between a first position with the safety device connection point located within the enclosure to a second position with the safety device connection point located at least partially outside of the enclosure to allow for connection of a safety device thereto. Connection of the safety device to the safety device connection point precludes movement of the longitudinal member back to the first position. An alarm device is located within the enclosure and is coupled to an alarm control circuit that activates and deactivates the alarm device. A switch is configured to operate the alarm control circuit. The switch is engaged by the longitudinal member to move the switch from an activated position for the alarm control circuit when the longitudinal member is in the first position to a deactivated position for the alarm control circuit when the longitudinal member is in the second position.

Another aspect of this disclosure relates to a method for providing an alarm to ensure use of a safety device. The method includes providing the device described herein with the longitudinal member initially coupled to the work structure in a configuration that requires decoupling of the device to obtain access to the work structure. The longitudinal member is in the second position to provide the deactivated position for the alarm control circuit of the alarm device. The device is decoupled from the work structure to provide access to the work structure. The decoupling of the device moves the longitudinal member to the first position to provide the active position for the alarm control circuit of the alarm device. The anchorage point of the longitudinal member is coupled to the work structure. The safety device is coupled to the safety device connection point of the longitudinal member. The longitudinal member is moved to the second position to provide the deactivated position for the alarm control circuit of the alarm device.

A further aspect of this disclosure relates to a method for providing an alarm to ensure use of a safety device. The method includes providing the device described herein further comprising a cord attached to the alarm control circuit. The alarm control circuit is disabled when the cord is attached and activated when the cord is detached. The anchorage point of the longitudinal member is coupled to the work structure such that movement of the work structure detaches the cord from the device to active the alarm control circuit. The safety device is coupled to the safety device connection point of the longitudinal member. The longitudinal member is moved to the second position to provide the deactivated position for the alarm control circuit of the alarm device.

The alarm activated safety device according to one embodiment is a device that activates an alarm if a user's lanyard is not hooked up to the connection point. The safety device can be used in outdoor situations such as to activate an alarm when a user is not hooked up to a lanyard when in a bucket truck. The device can also be used in other outdoor or indoor applications for example when a user is using equipment such as scissor lift or boom lift.

BRIEF DESCRIPTION OF THE DRAWINGS

The present invention will be more fully understood and appreciated by reading the following Detailed Description in conjunction with the accompanying drawings. The accompanying drawings illustrate only typical embodiments of the disclosed subject matter and are therefore not to be considered limiting of its scope, for the disclosed subject matter may admit to other equally effective embodiments.

Reference is now made briefly to the accompanying drawings, in which.

DETAILED DESCRIPTION

One aspect of the present disclosure relates to an alarm activated safety device. The alarm activated safety device includes an enclosure having an opening extending therethrough. A longitudinal member having an anchorage point for coupling the alarm activated safety device to a work structure and a safety device connection point located thereon extends through the opening of the enclosure and is moveable between a first position with the safety device connection point located within the enclosure to a second position with the safety device connection point located at least partially outside of the enclosure to allow for connection of a safety device thereto. Connection of the safety device to the safety device connection point precludes movement of the longitudinal member back to the first position. An alarm device is located within the enclosure and is coupled to an alarm control circuit that activates and deactivates the alarm device. A switch is configured to operate the alarm control circuit. The switch is engaged by the longitudinal member to move the switch from an activated position for the alarm control circuit when the longitudinal member is in the first position to a deactivated position for the alarm control circuit when the longitudinal member is in the second position.

Figure 8:
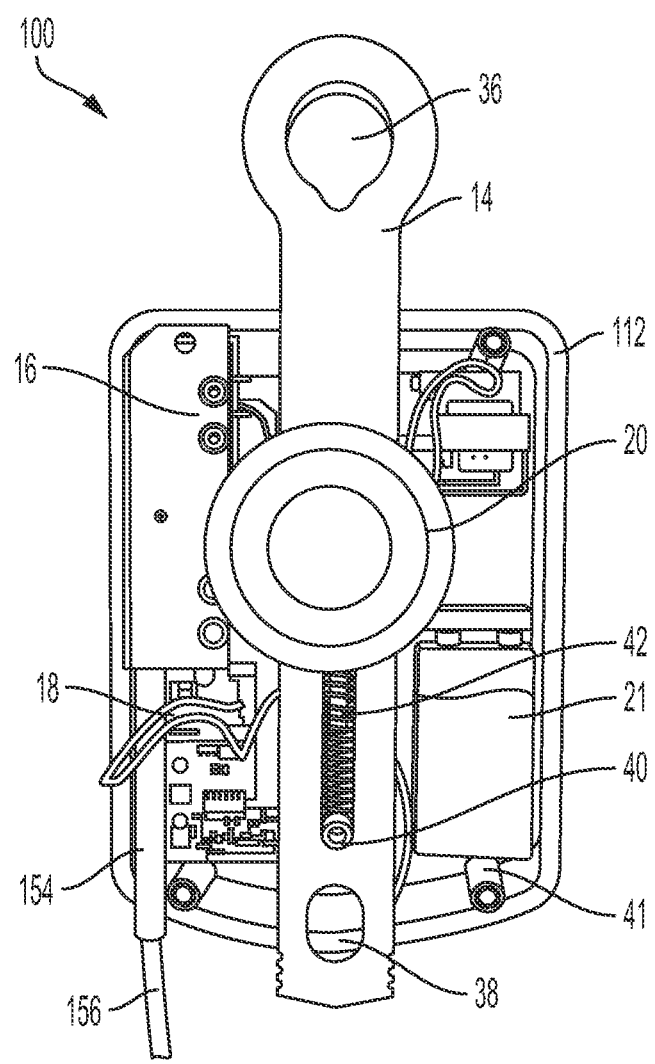
FIG. 8 is a frame disassembled view of the exemplary alarm activated safety device shown in FIG. 7.

An exemplary alarm activated safety device 10 of this disclosure is illustrated in FIGS. 1A-6. The alarm activated safety device 10 in this example includes an enclosure 12, a longitudinal member 14, a switch 16, an alarm control circuit 18, an alarm device 20, and a battery 21, although the alarm activated safety device 10 can include other types and/or numbers of additional elements in other combinations, such as an optional radiofrequency (RF) transmitter or an optional activation cord (as shown in FIG. 8 for example).

The alarm activated safety device 10 advantageously can be connected to a safety device, such as a lanyard, and provide an alert when the safety device (lanyard) is not connected. Thus, the alarm activated safety device 10 provides a reminder to users to ensure the use of safety equipment. The alert can be provided locally, as well as to a remote device to provide compliance with safety requirements. The device is durable enough to hold a person and can have a high weight rating.

Referring now to FIGS. 1A-1D, the enclosure 12 surrounds and/or protects the internal components of the alarm activated safety device 10. The enclosure 12 in some examples can be vacuumed formed and/or injection molded, although other methods of manufacture can be employed. The enclosure 12 can be waterproof, shockproof, and or heatproof. In one example, the enclosure is formed from an injected molded thermoplastic using a resin with or without one or more additives depending on the desired characteristics of the enclosure 12.

Figure 1A:
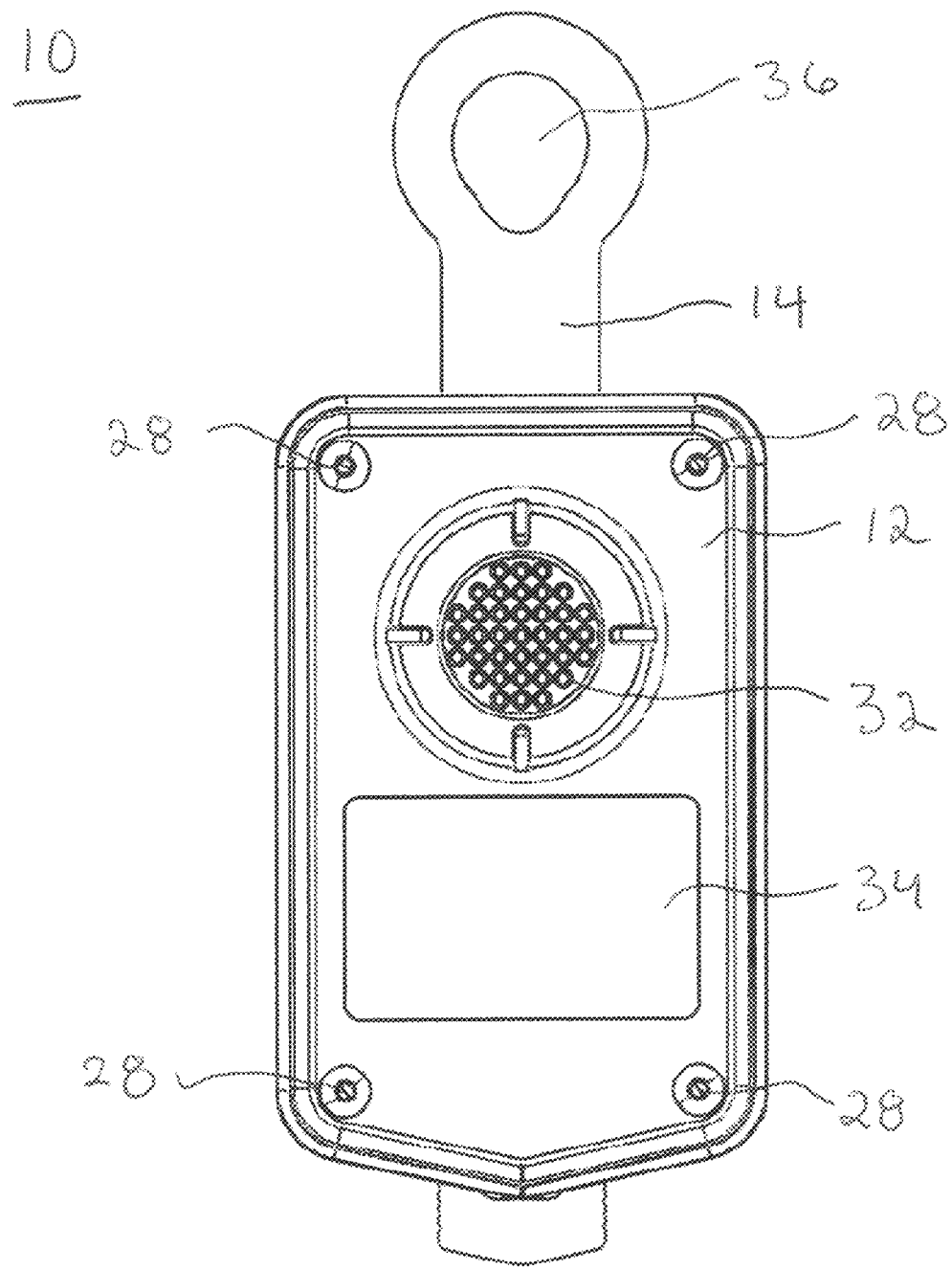
FIGS. 1A, 1B, 1C, and 1D are front, rear, perspective, and disassembled perspective views of an exemplary alarm activated safety device of this disclosure.
Figure 1B:
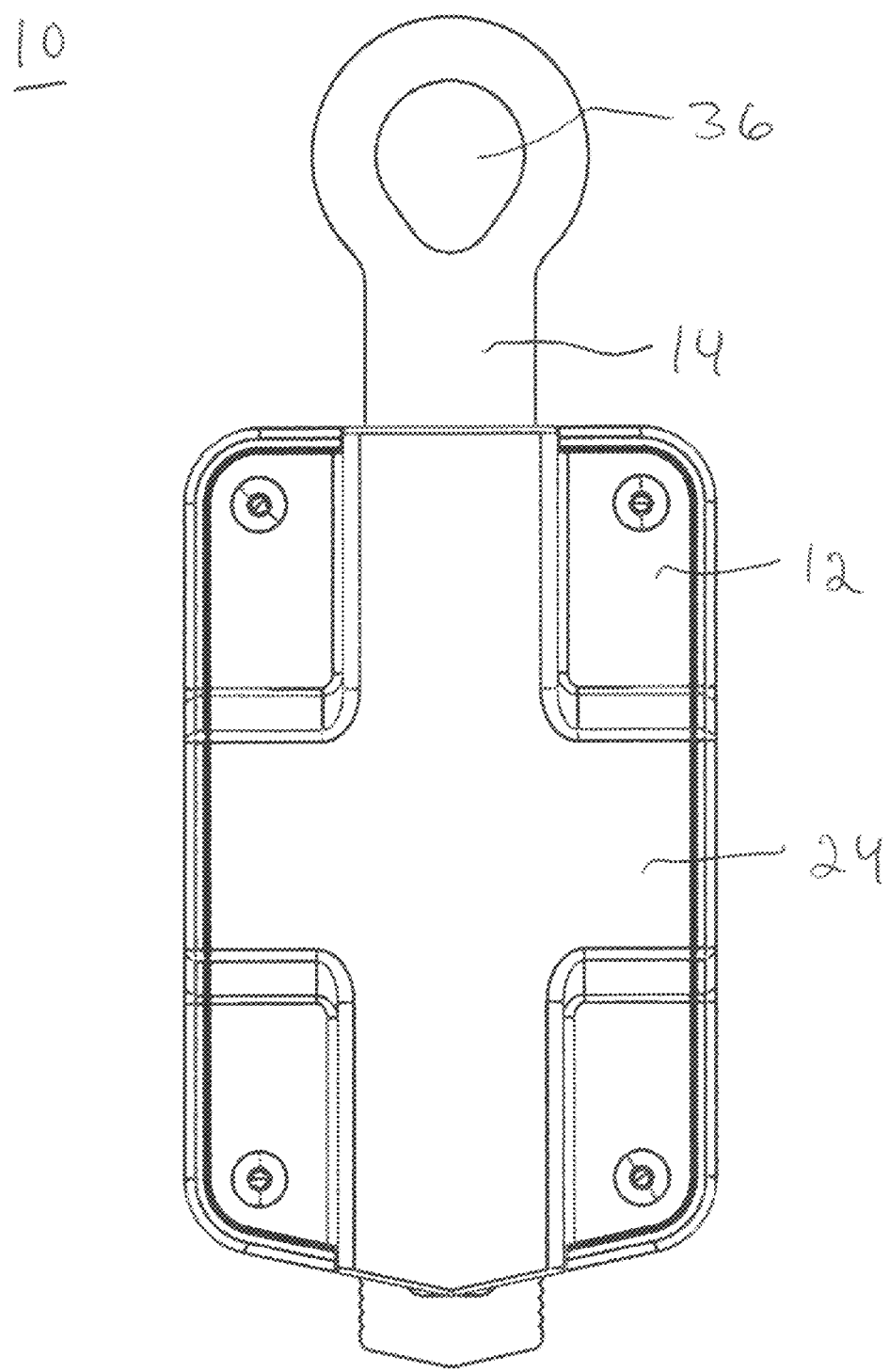
Figure 1C:
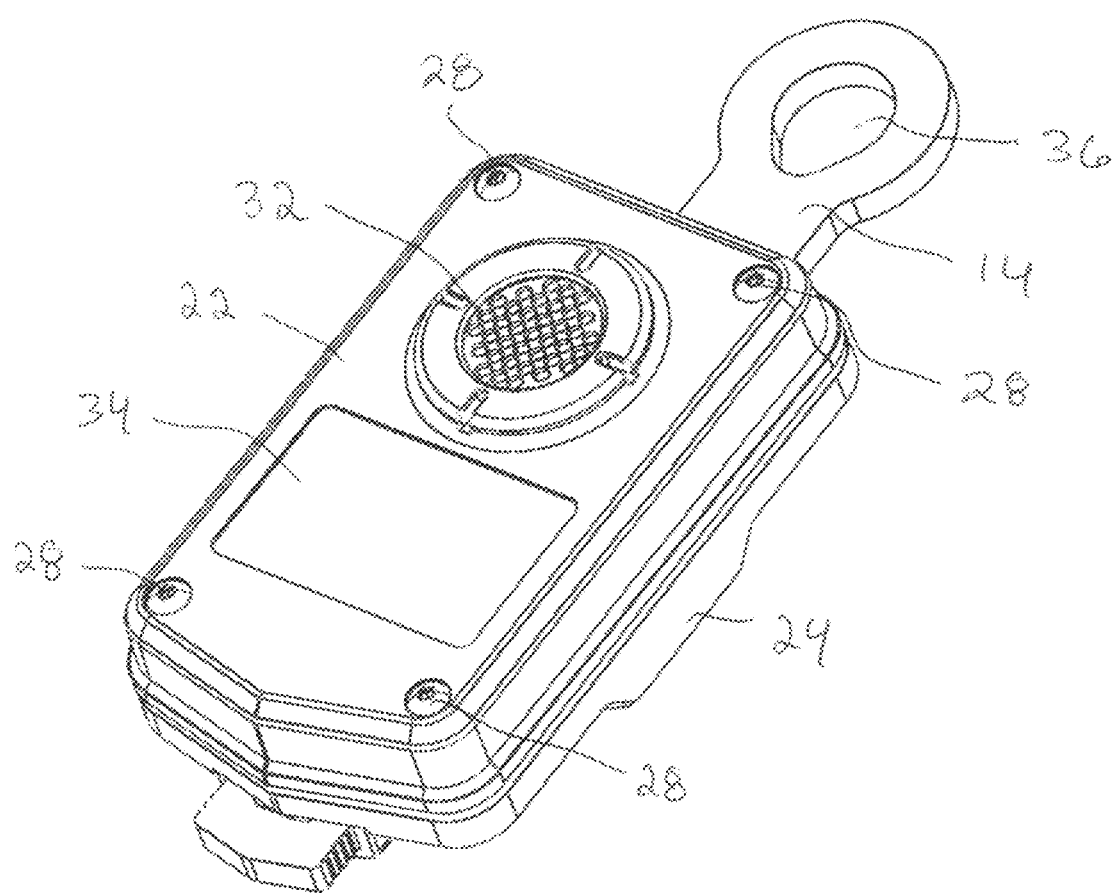
Figure 1D:
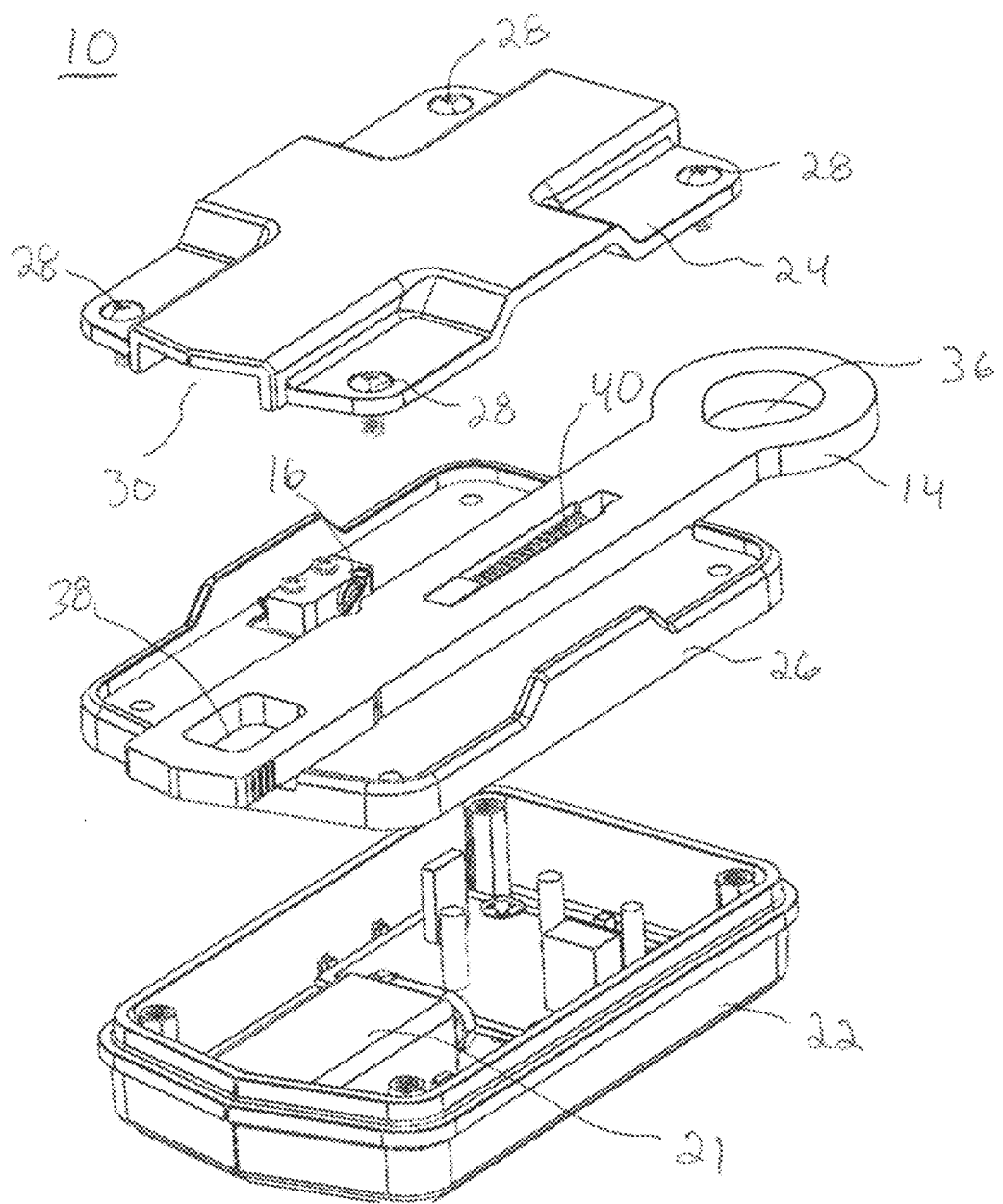

Referring more specifically to FIG. 1D, in this example the enclosure 12 includes a front plate 22, back plate 24, and center plate 26, which are all coupled together using screws 28, although the enclosure 12 can have other constructions. The enclosure 12 includes openings 30 at opposing ends thereof through which the longitudinal member 14 extends. The center plate 26 supports the longitudinal member 14. Referring to FIGS. 1A and 1C, in this example, front plate 22 includes openings 32 for emitting sound from the alarm device 20. In this example, front plate 22 also includes a cover 34 for providing access to internal elements of the alarm activated safety device 10, although in other examples the enclosure 12 can be sealed.

Longitudinal member 14 extends through enclosure 12. In this example, the longitudinal member 14 is formed of stainless steel or low carbon steel to provide a high weight rating to support the weight of a user of the alarm activated safety device 10 in the event of a fall, although other suitable materials could be employed. In one example, has a thickness of about ¼ inch. The longitudinal member 14 can be machined, laser cut, forged, or blanked. The longitudinal member 14 can include a rust prevention treatment in some examples.

Longitudinal member 14 includes an anchorage point 36 located at one end thereof and extending out of the enclosure 12. Anchorage point 36 provides an aperture that can be utilized to couple the alarm activated safety device 10 to a work structure, such as the side of a bucket truck for example. For example, the anchorage point 36 could be coupled to the work structure using a carabiner. Although the anchorage point 36 is shown in FIGS. 1A-1D, 2, and 3, it is to be understood that the anchorage point 36 can have other shapes and sizes. The anchorage point 36 can also be utilized to move the longitudinal member 14 within the enclose as described in further detail below.

Figure 2:
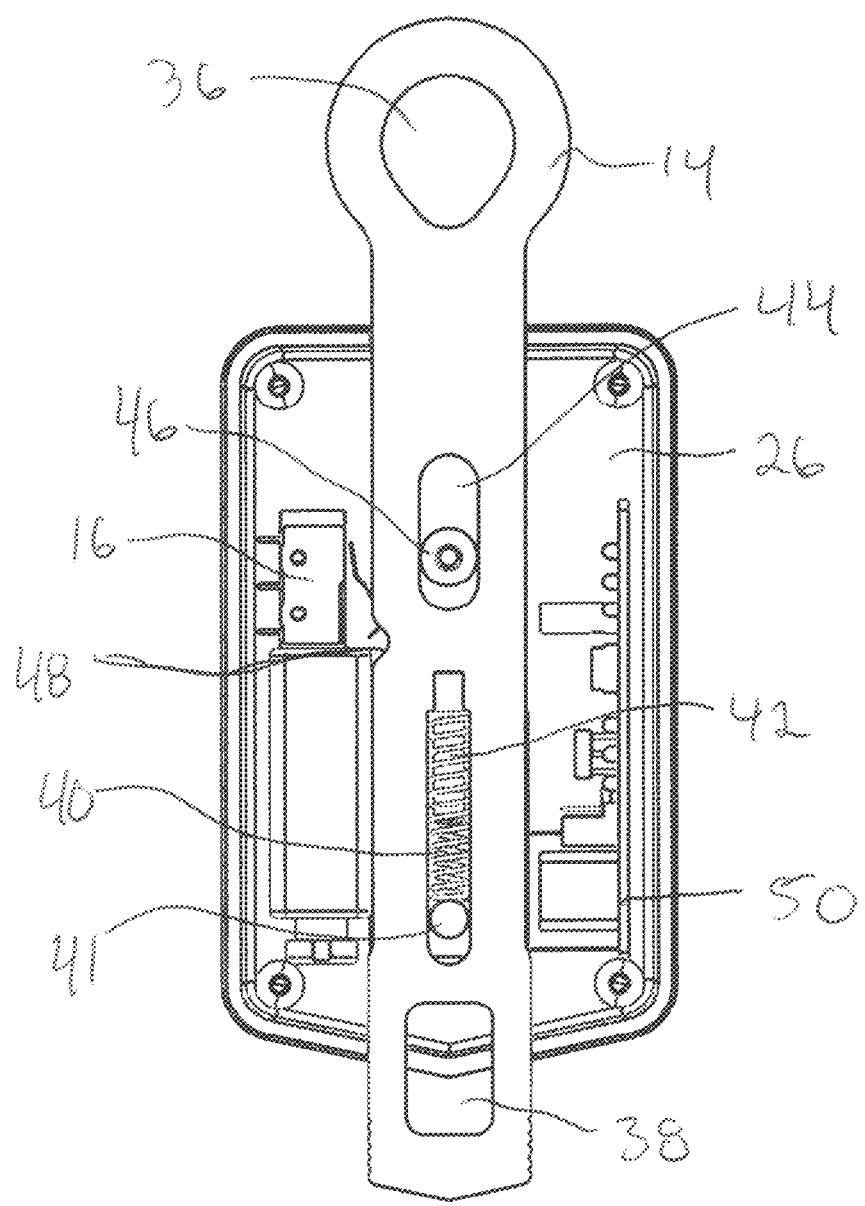
FIG. 2 is a front disassembled view of the exemplary alarm activated safety device of the FIGS. 1A-1D with the safety device connection point extend from the enclosure.
Figure 3:
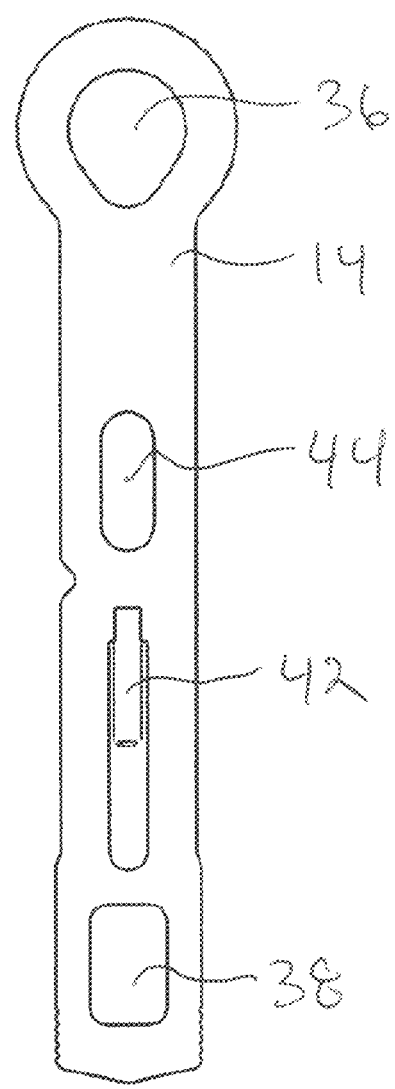
FIG. 3 is a front view of an exemplary longitudinal member of the alarm activated safety device of this disclosure.

Referring now more specifically to FIGS. 1D, 2 and 3, the longitudinal member 14 also includes a safety device connection point 38 located thereon at an end opposite the anchorage point 36. Safety device connection point 38 is an aperture configured to couple the longitudinal member 14 to a safety device, such as a lanyard, by way of example only. In one example, the safety device can be coupled to the safety device connection point 38 using a carabiner. Although the safety device connection point 38 is shown in FIGS. 1D, 2, and 3, it is to be understood that the safety device connection point 38 can have other shapes and sizes.

The longitudinal member 14 is moveable between a first position with the safety device connection point 38 located within the enclosure 12 (FIGS. 1A-IC) to a second position with the safety device connection point 38 located at least partially outside of the enclosure 14 (FIG. 2). The second position shown in FIG. 2 allows for connection of a safety device, such as the carabiner of a safety lanyard, to the safety device connection point 38 of the longitudinal member. In one example, longitudinal member 14 is spring-loaded using a spring 40 as shown in FIGS. 1D and 2. In this example, the spring 40 is a compression spring formed of stainless steel, although other materials may be employed. The spring 40 is compressed against a first post 41 located, for example, on the center plate 26. The spring 40 in this example has a relaxed length of about 1.75 inches, an outer diameter of about 0.250 inches, and employs 0.026 inch diameter wire with approximately 4.8 pounds/inch compression rate, although springs having other configurations may be employed.

The spring 40 biases the longitudinal member 14 to the first position with the safety device connection point 38 located within the enclosure 12. The longitudinal member 14 can be pushed against the force of and compress the spring 40 to expose the safety device connection point 38, as shown in FIG. 2. Connection of the safety device, such as the carabiner of a safety lanyard, to the safety device connection point 38 precludes movement of the longitudinal member 14 back to the first position.

Referring now more specifically to FIG. 3, in one example, the longitudinal member 14 can include a guidance mandrel 42 for receiving the spring 40. In one example, the guidance mandrel 42 has a diameter of about 3/16 inches, although configurations that do not employ the guidance mandrel 42 are contemplated. In one example, longitudinal member 14 includes an aperture 44 for receiving a second post 46 located, for example, on the center plate 26 to guide movement of the longitudinal member 14 within the enclosure 12. The longitudinal member 14 also includes an indentation 48 along an edge surface thereof that is configured to engage with the switch 16 as the longitudinal member 14 moves between the first position (e.g., FIG. 1A) and the second position (FIG. 2).

Figure 4:
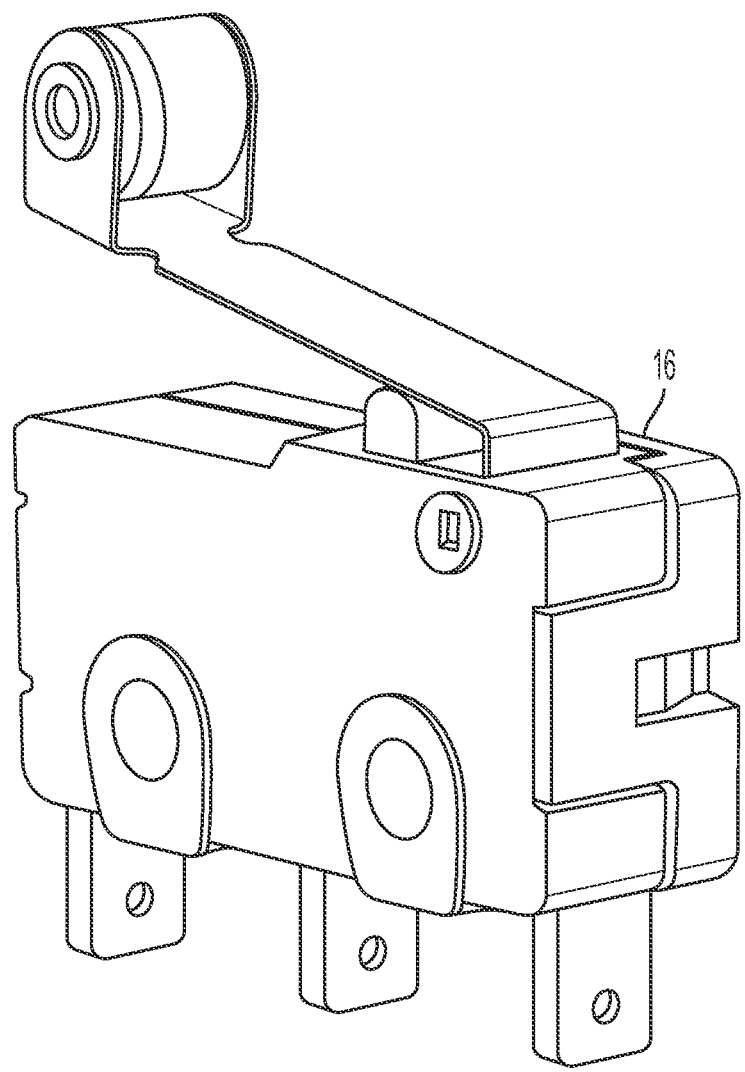
FIG. 4 is an image of an exemplary switch that may be employed in the exemplary alarm activated safety device of the FIGS. 1A-1D.
Figure 5:
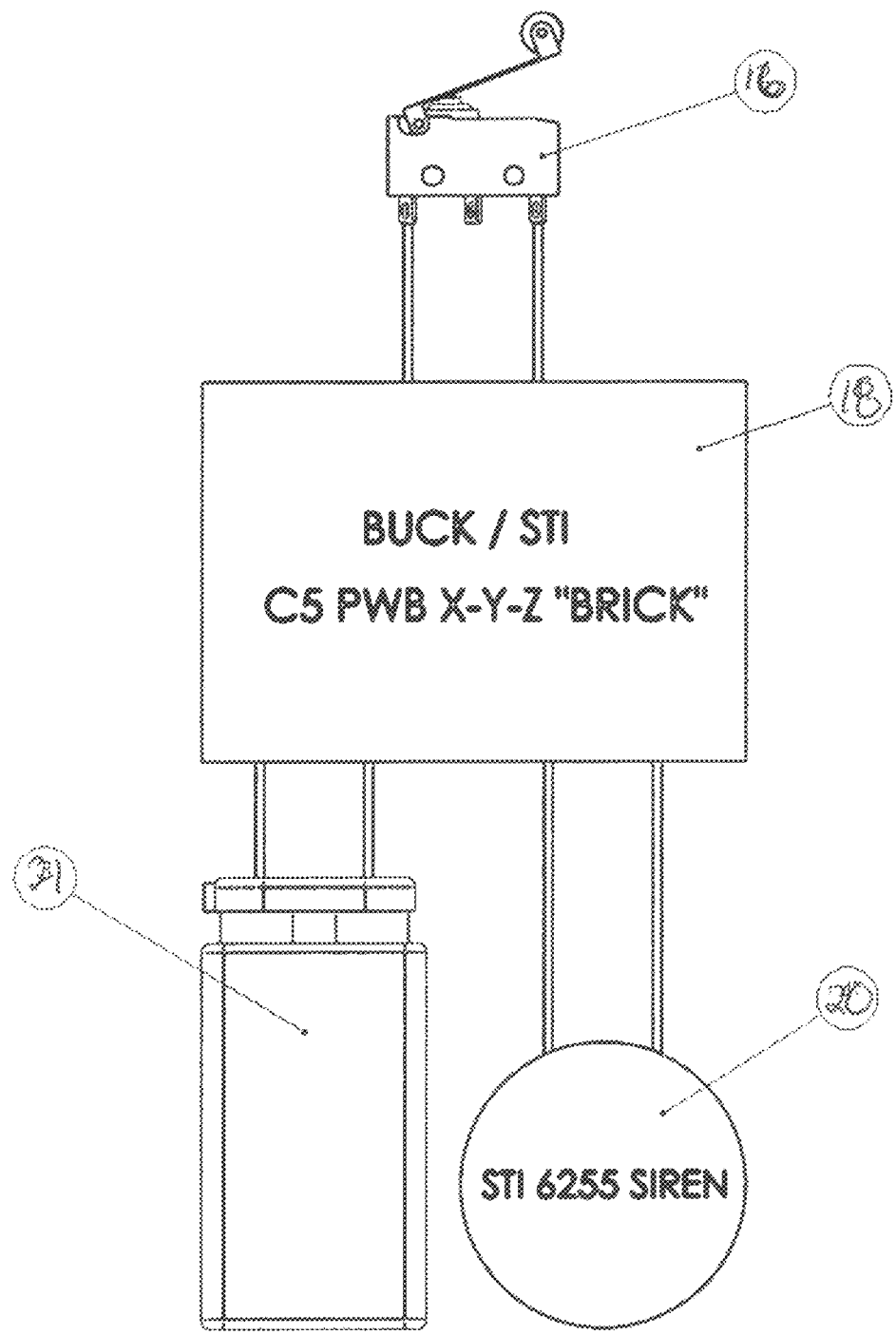
FIG. 5 is a schematic of a switch coupled to an alarm control circuit of an alarm device that may be employed in the exemplary alarm activated safety device of the FIGS. 1A-ID.

Referring now to FIGS. 2, 4, and 5, the switch 16 is coupled to and configured to operate the alarm control circuit 18 of the alarm activated safety device 10. In one example, the switch 16 is a reed switch. The switch 16 is configured to activate or deactivate the alarm control circuit 18 based on movement of the switch 16. The switch 16 is configured to be located in the indentation 48 of the longitudinal member 14 when the alarm control circuit 18 is activated (i.e., the alarm device 20 is turned on). As shown, for example, in FIG. 2, the switch 16 is engaged by the longitudinal member 14 through the indentation 48 when the longitudinal member 14 is moved from the first position (e.g., FIG. 1A) to the second position (FIG. 2). This movement puts the switch 16 in a deactivated position for the alarm control circuit 18 such that the alarm device 20 is turned off.

Referring to FIG. 5, the alarm control circuit 18 is coupled to the switch 16 and the alarm device 20 and the battery 21, which may be a 9V battery by way of example. In one example, the alarm control circuit 18 is located on a printed wiring board. The alarm control circuit 18 is controlled by operation of the switch 16. When the switch 16 is in the activated position (i.e., when the longitudinal member 14 is in the first position shown in FIG. 1A, for example), the alarm control circuit 18 is closed to provide power to alarm device 20 from the battery 21 to provide an output alarm from the alarm device 20. This position indicates that the safety device, such as a lanyard, is not coupled to the longitudinal member 14 and therefore provides a reminder to the user to attach the safety device. When the switch 16 is in the deactivated position (i.e., when the longitudinal member 14 is in the second position shown in FIG. 2), the alarm control circuit 18 is opened and the alarm device 20 does not receive power from the battery 21. Thus, when the safety device is attached the longitudinal member 14 remains in the second position and the alarm from the alarm device 20 is turned off.

The alarm device 20 is located within the enclosure 12 and is coupled to the alarm control circuit 18. The alarm control circuit 18 activates and deactivates the alarm device 20 based on operation of the switch 16 as described above. In one example, the alarm device 20 is a model number STI-6200 or STI-6255 siren produced by STI Electronics, Inc. (Madison, Alabama), although other alarm devices could be employed. In one example, the alarm device 20 is aligned with the openings 32 in the enclosure 12 to emit sound therefrom. In one example, the alarm device 20 has an output of about 105 dB, although other volumes can be used. In one example, the volume of the alarm device 20 is adjustable. In another example, the volume of the alarm device 20 is variable. In one example, the alarm device 20 provides a first output at a lower volume during a first period of time, such as about 15 seconds, after the switch 16 is moved to the activated position for the alarm control circuit 18 and a second output at a higher volume after the first period of time has expired.

In another example, the alarm activated safety device 10 includes an RF transmitter 50 that allows for transfer of the alarm to a remote device having a RF receiver to receive an indication of a failure to couple the safety device at a remote location. In one example, the remote device is coupled to a plurality of alarm activated safety devices to obtain safety information. For example, a foreman could have access to the remote device to determine the status of the safety connection for a number of workers.

Figure 6A:
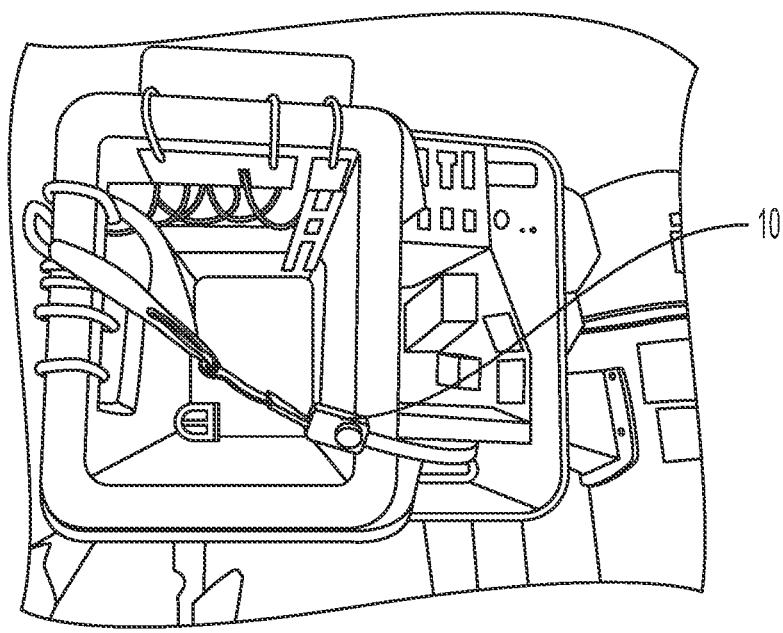
FIGS. 6A and 6B are images of the exemplary alarm activated safety device of FIGS. 1A-1D employed as a barrier to entry for a bucket truck.
Figure 6B:
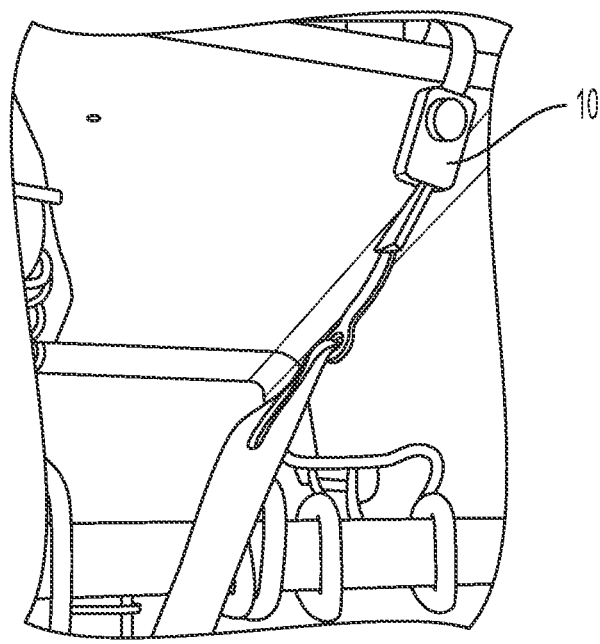

An exemplary operation of the alarm activated safety device shown in FIGS. 1A-6B will now be described. By way of example, the alarm activated safety device 10 can be connected to a work structure, such as a bucket truck, a scissor lift, or a boom lift, by way of example only, in a manner that precludes entry to the work structure as shown in FIGS. 6A and 6B, by way of example only. Although one configuration for providing a barrier to entry is shown, other configurations may be contemplated. In other examples, the barrier to entry may be provided by a sewn strap mesh or a "rain bonnet." Referring again to FIGS. 6A and 6B, in this configuration, the longitudinal member 14 is held in the second position by the attached strap across the bucket, and the alarm control circuit 18 is deactivated when the alarm activated safety device 10 is connected to the strap.

When the user disconnects the alarm activated safety device 10 to obtain access to the work structure, the longitudinal member 14 moves to the first position (e.g., as shown in FIG. 1A) and the alarm control circuit 18 is activated, by corresponding movement of the switch 16, to provide an output from the alarm device 20. In one example, the alarm device 20 provides an initial low volume output for a first period of time, such as about 15 seconds, that allows the user time to access the work structure and attach the safety device to the longitudinal member 14 to deactivate the alarm device 20. When the user fails to attach the safety device to the longitudinal member 14 after the first period of time, the volume of the output of the alarm device 20 is increased to provide a reminder to attach the safety device to the longitudinal member 14. In one example, the volume of the output is about 105 decibels. Attachment of the safety device requires the longitudinal member 14 to be extended to the second position (as shown in FIG. 2) to expose the safety device connection point 38, which in turn deactivates the alarm control circuit 18 through corresponding movement of the switch 16. The alarm device 20 remains deactivated while the longitudinal member 14 is extended from the enclosure 12. The connection of the safety device, such as a lanyard, precludes the longitudinal member 14 from moving back to the first position.

Another exemplary alarm activated safety device 100 of this disclosure is illustrated in FIGS. 7-12B. The alarm activated safety device 100 is the same in structure and operation as the alarm activated safety device 10 except as described below. Like elements are given like reference numerals.

Figure 7:
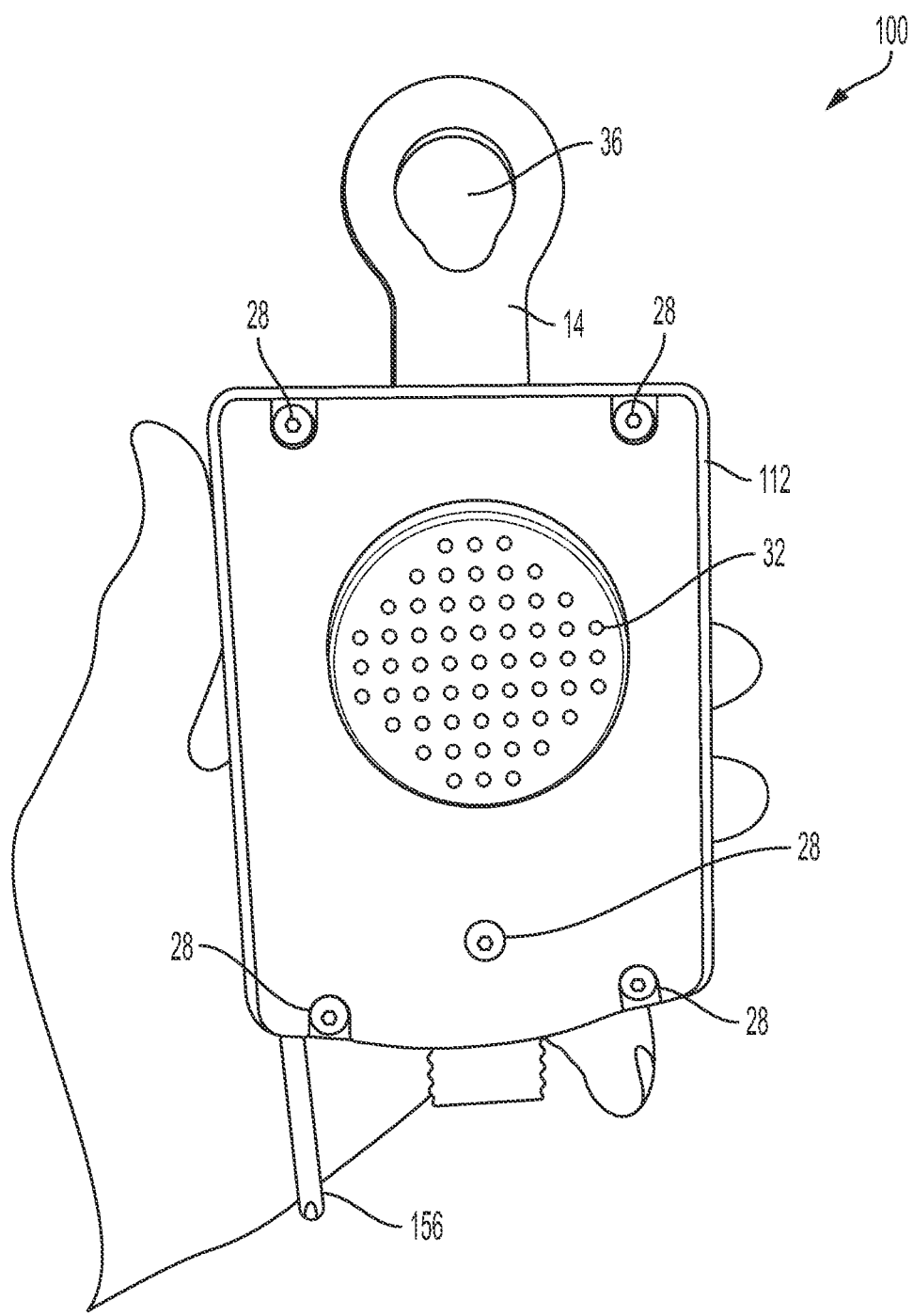
FIG. 7 is a front view of another exemplary alarm activated safety device of this disclosure.

Referring to FIGS. 7 and 8, in this example, the enclosure 112 has an opening 152 for a cord connection port 154 configured to receive a detachable cord 156 or other means of activating the alarm activated safety device 100. The cord 156 can be connected to the alarm activated safety device 100 in the cord connection port 154. The cord connection port 154 provides a tube that receives and holds the cord 156 in place in the alarm activated safety device 100. The tube can have a dent to assist in holding the cord 156 within the cord connection port 154, although other methods can be used to hold the cord 156 within the enclosure 112 such as frictional tension or magnets, by way of example. In one example, the cord 156 is PVC coated.

Figure 9:
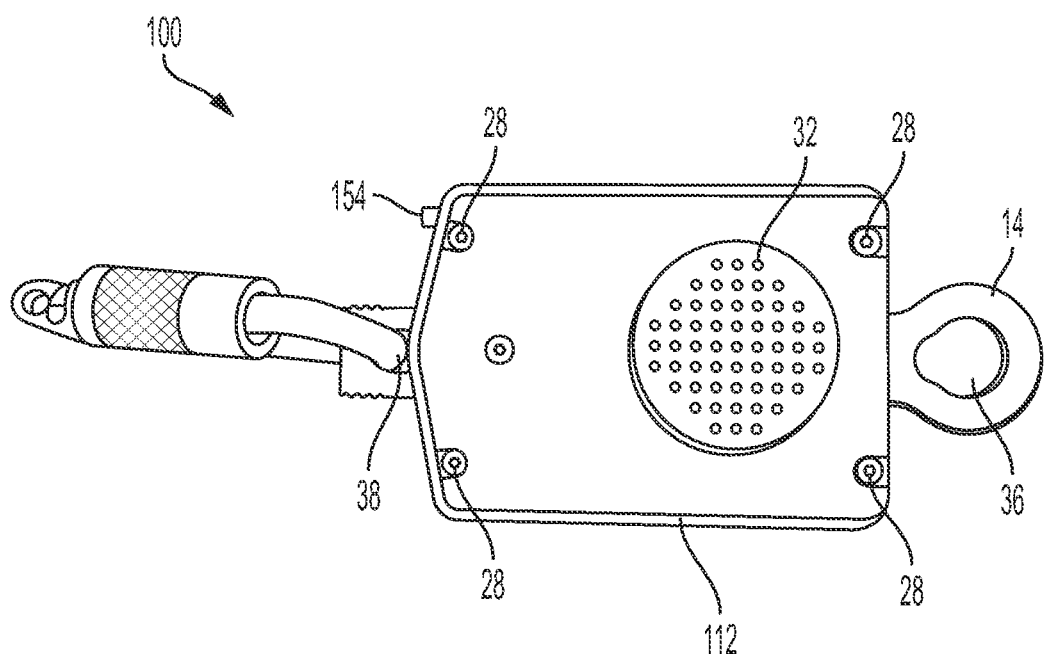
FIG. 9 is a front view of the exemplary alarm activated safety device shown in FIG. 7 coupled to a safety device.
Figure 10A:
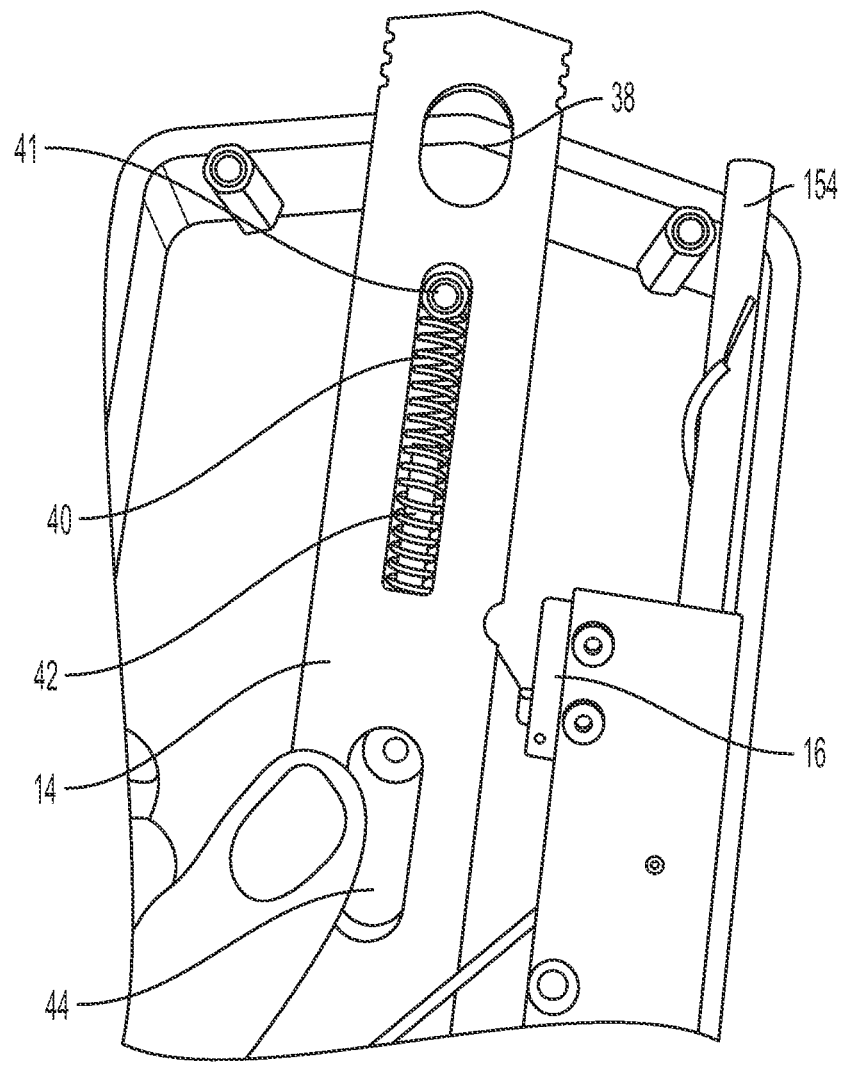
FIG. 10A is a front disassembled view of the exemplary alarm activated safety device shown in FIG. 7 with the longitudinal member is a first position.
Figure 10B:
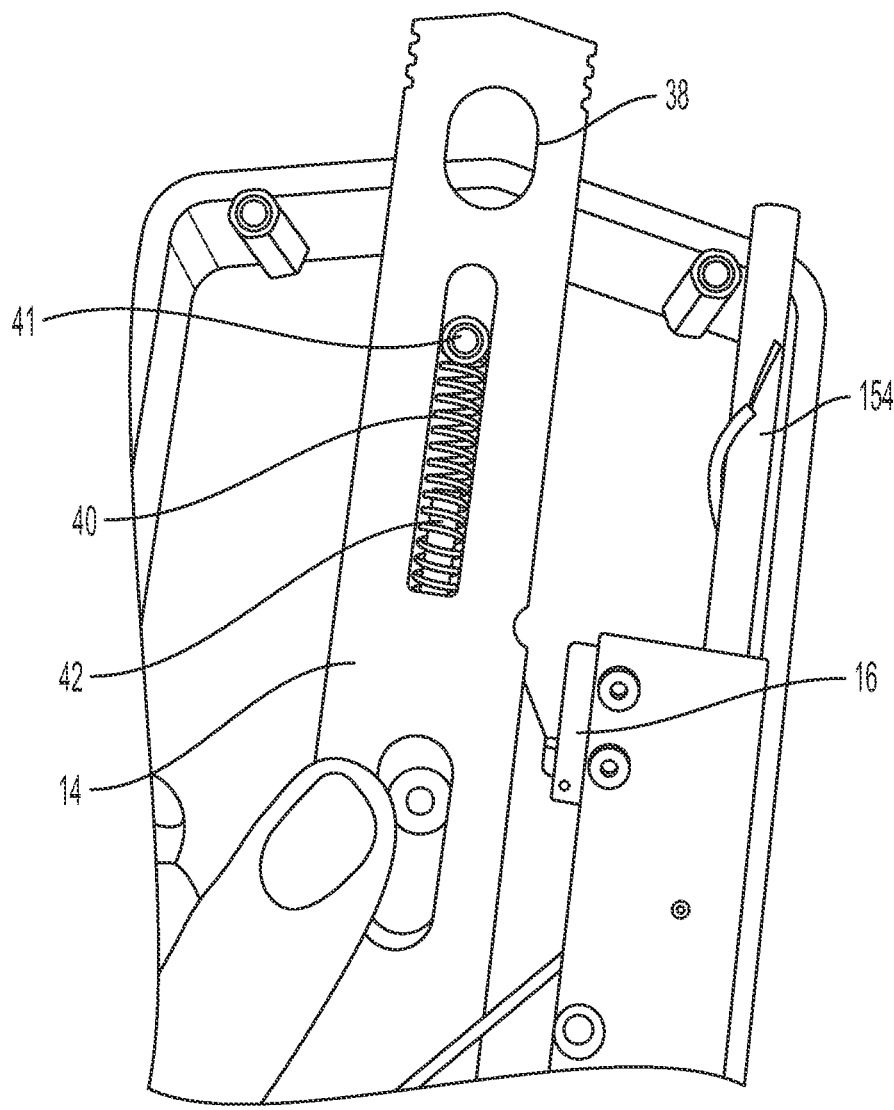
FIG. 10B is a front disassembled view of the exemplary alarm activated safety device shown in FIG. 7 with the longitudinal member is a second position with the safety connection point extending out of the enclosure.
Figure 11:
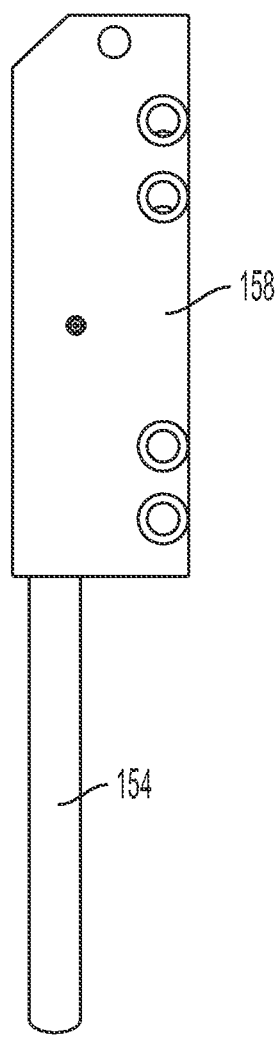
FIG. 11 is a front view of an exemplary switch housing that may be employed in the alarm activated safety device shown in FIG. 7.

The cord 156 when connected within the enclosure 112 contacts a switch, such as a reed switch, held in switch casing 158 (shown in FIG. 11) that deactivates the alarm device 20. When the cord is disconnected, the alarm device 20 is activated until the longitudinal member 14 is extended from the first position (FIG. 10A) into the second position as shown in FIG. 10B, which moves the switch 16. The longitudinal member 14 is held in the second position by connection of a safety device, such as a lanyard, to the safety device connection point 38 of the longitudinal member as shown in FIG. 9.

Figure 12A:
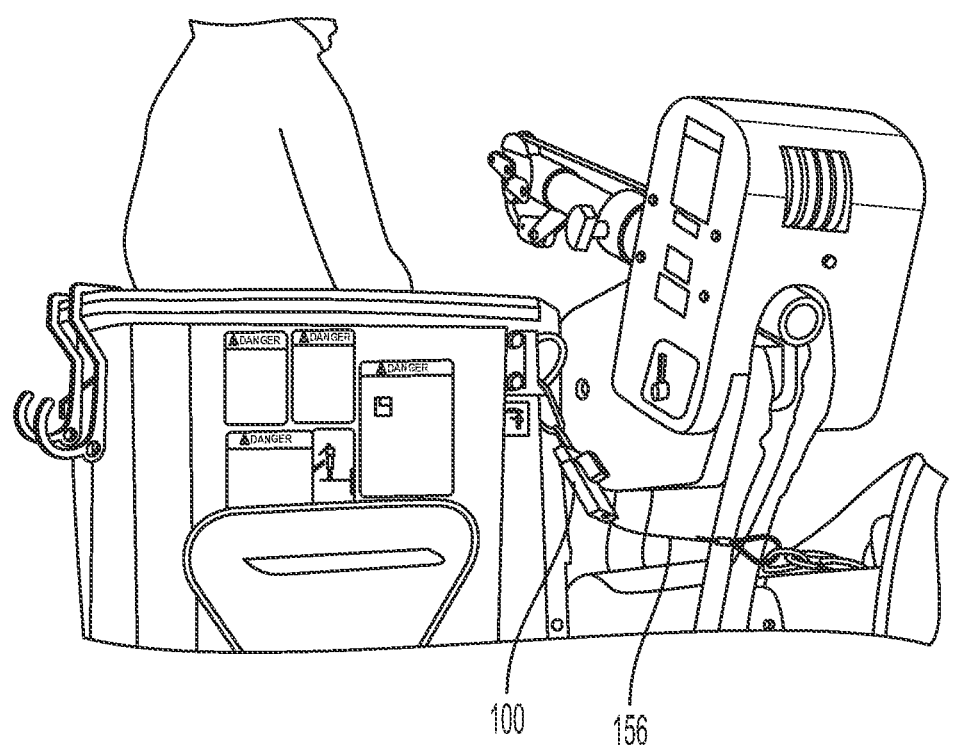
FIG. 12A is an image showing the exemplary alarm activated safety device coupled to a bucket truck with the activation cord attached.
Figure 12B:
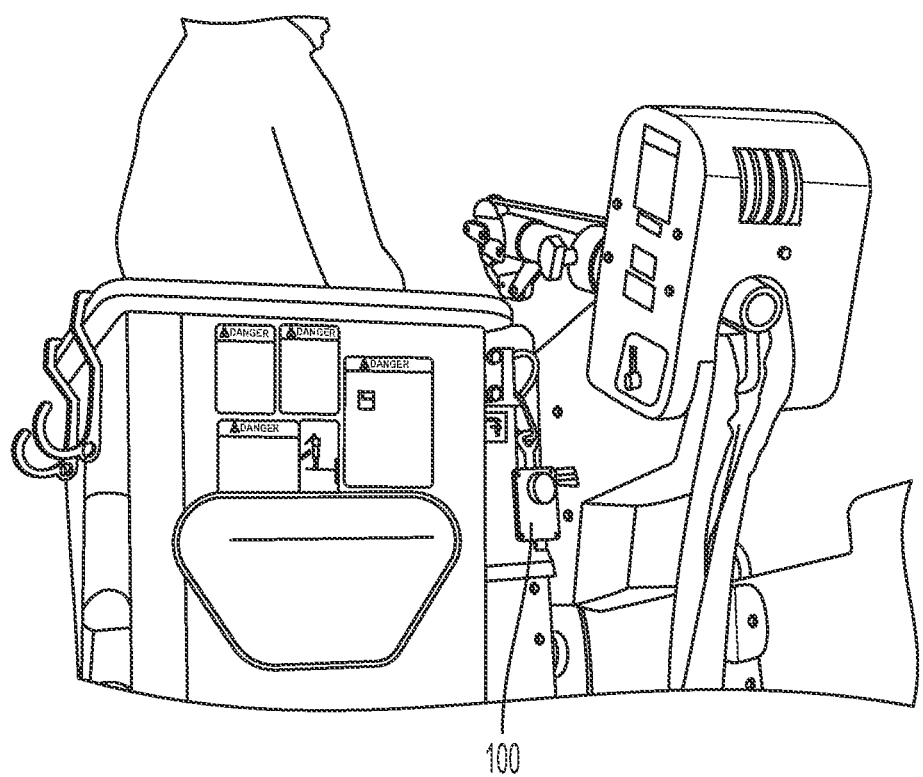
FIG. 12B is an image showing the exemplary alarm activated safety device coupled to a bucket truck with the activation cord detached.

In one example, as shown in FIGS. 12A and 12B, the alarm activated safety device can be connection through the anchorage point 36 to the side of a bucket truck with the cord 156 inserted into the enclosure 112. The other end of the cord 156 is attached to a stationary portion of the bucket truck during operation of the bucket. In this matter, the cord 156 can be disconnected when the bucket of the bucket truck is raised. The other end of the cord is connected to another anchorage point on the bucket so the cord 156 is not lost. The connection causes the cord 156 to be pulled out from the enclosure 112 when raising the bucket up out of the cradle. Other potential activating means are possible in addition to the cord 156. For instance, a key can be turned to "activate" the alarm. The cord 156 can be reattached by inserting it into the cord connection port 154 to deactivate the alarm device 20.

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure. The terminology used herein is for the purpose of describing particular embodiments only and is not intended to be limiting of the invention. As used herein, the singular forms "a" "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed:

1. An alarm activated safety device comprising:
an enclosure having an opening extending therethrough;
a longitudinal member having an anchorage point for coupling the alarm activated safety device to a work structure and a safety device connection point located thereon, the longitudinal member extending through the opening of the enclosure and moveable between a first position with the safety device connection point located within the enclosure to a second position with the safety device connection point located at least partially outside of the enclosure to allow for connection of a safety device thereto, wherein connection of the safety device to the safety device connection point precludes movement of the longitudinal member back to the first position;
an alarm device coupled to an alarm control circuit that activates and deactivates the alarm device; and
a switch configured to operate the alarm control circuit, wherein the switch is engaged by the longitudinal member to move the switch from an activated position for the alarm control circuit when the longitudinal member is in the first position to a deactivated position for the alarm control circuit when the longitudinal member is in the second position.

2. The device of claim 1, wherein the enclosure is waterproof, shockproof, or heatproof.

3. The device of claim 1, wherein the enclosure has one or more openings for emitting sound from the alarm device.

4. The device of claim 1, wherein the longitudinal member is spring-loaded within the enclosure.

5. The device of claim 1, wherein the longitudinal member is formed from steel.

6. The device of claim 1, wherein the switch is a reed switch.

7. The device of claim 6, wherein the longitudinal member comprises an indentation along a surface thereof for receiving the reed switch therein.

8. The device of claim 1, wherein the alarm device provides a first output during a first period of time after the switch is moved to the activated position for the alarm control circuit and a second output after the first period of time has expired.

9. The device of claim 8, wherein the first output is at a lower volume than the second output.

10. The device of claim 1, further comprising a cord attached to the alarm control circuit wherein the alarm control circuit is disabled when the cord is attached and activated when the cord is detached.

11. The device of claim 1, wherein the alarm device is configured to provide an alarm to a remote location.

12. The device of claim 1, wherein the safety device is a lanyard.

13. The device of claim 1, wherein the work structure is a bucket truck, a scissor lift, or a boom lift.

14. A method for providing an alarm to ensure use of a safety device, the method comprising:
    providing the device of claim 1 with the longitudinal member initially coupled to the work structure in a configuration that requires decoupling of the device to obtain access to the work structure, wherein the longitudinal member is in the second position to provide the deactivated position for the alarm control circuit of the alarm device;
    decoupling the device from the work structure to provide access to the work structure, wherein the decoupling of the device moves the longitudinal member to the first position to provide the active position for the alarm control circuit of the alarm device;
    coupling to the anchorage point of the longitudinal member to the work structure; and
    coupling the safety device to the safety device connection point of the longitudinal member, wherein the longitudinal member is moved to the second position to provide the deactivated position for the alarm control circuit of the alarm device.

15. The method of claim 14, wherein the alarm device provides a first output during a first period of time after the activated position for the alarm control circuit is provided and a second output after the first period of time has expired.

16. The method of claim 15, wherein the first output is at a lower volume than the second output.

17. The method of claim 14, wherein the work structure is a bucket truck, a scissor lift, or a boom lift.

18. The method of claim 17, wherein the device is initially coupled to prevent access to a work compartment of the work structure.

19. A method for providing an alarm to ensure use of a safety device, the method comprising:
    providing the device of claim 1, the device further comprising a cord or key attached to the alarm control circuit wherein the alarm control circuit is disabled when the cord or key is attached and activated when the cord or key is detached;
    coupling the anchorage point of the longitudinal member to the work structure such that movement of the work structure detaches the cord or key from the device to active the alarm control circuit; and
    coupling the safety device to the safety device connection point of the longitudinal member, wherein the longitudinal member is moved to the second position to provide the deactivated position for the alarm control circuit of the alarm device.

20. The method of claim 19, wherein the work structure is a bucket truck, a scissor lift, or a boom lift.

* * * * *